United States Patent
Kwong et al.

(10) Patent No.: US 11,153,926 B2
(45) Date of Patent: Oct. 19, 2021

(54) TRANSITIONING TO CELL DCH RRC STATE TO REPORT APPLICATION-LEVEL MEASUREMENT

(71) Applicant: Telefonaktiebolaget LM Ericsson (publ), Stockholm (SE)

(72) Inventors: Waikwok Kwong, Solna (SE); Cecilia Eklöf, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 4 days.

(21) Appl. No.: 16/496,068

(22) PCT Filed: Oct. 25, 2017

(86) PCT No.: PCT/SE2017/051045
§ 371 (c)(1),
(2) Date: Sep. 20, 2019

(87) PCT Pub. No.: WO2018/174762
PCT Pub. Date: Sep. 27, 2018

(65) Prior Publication Data
US 2021/0120621 A1    Apr. 22, 2021

Related U.S. Application Data

(60) Provisional application No. 62/476,576, filed on Mar. 24, 2017.

(51) Int. Cl.
*H04W 76/27* (2018.01)
*H04W 24/10* (2009.01)
*H04W 80/12* (2009.01)

(52) U.S. Cl.
CPC ........... *H04W 76/27* (2018.02); *H04W 24/10* (2013.01); *H04W 80/12* (2013.01)

(58) Field of Classification Search
CPC ............... H04W 76/046; H04W 24/08; H04W 28/0221; H04W 28/0289; H04W 52/0222;
(Continued)

(56) References Cited

U.S. PATENT DOCUMENTS 7,853,266 B2 * 12/2010 Moinet ................. H04L 47/745
                                                                        455/453
8,125,962 B2 *  2/2012 Charpentier .......... H04W 24/10
                                                                        370/332
(Continued)

FOREIGN PATENT DOCUMENTS

EP    1641302 A1    3/2006

OTHER PUBLICATIONS

Korean Office Action dated Nov. 30, 2020 for Korean Patent Application No. 10-2019-7031264, 12 pages (including English translation).
3GPP TSG-RAN WG2 Meeting #97, R2-1702256, "Introduction of QoE Measurement Collection for streaming services," Athens, Greece, Feb. 13-17, 2017, 58 pages.
International Search Report and Written Opinion of the International Searching Authority, PCT/SE2017/051045 dated Dec. 19, 2017, 14 pages.
(Continued)

*Primary Examiner* — Man U Phan
(74) *Attorney, Agent, or Firm* — Sage Patent Group

(57) ABSTRACT

According to one example embodiment, a method in a user equipment, UE, includes receiving a request from a radio access network for a measurement report for an application operating at a layer above a radio resource control, RRC, protocol layer. The UE generates the measurement report in response to the request and determines a current RRC connected state of the UE when the measurement report is ready to be sent. In response to determining that the current RRC connected state of the UE is not a CELL_DCH RRC state, the UE sends a cell update message to the radio access network and receives instructions from the radio access network to transition to the CELL_DCH RRC state. The UE transitions to the CELL_DCH RRC state and transmits the measurement report while the UE is in the CELL_DCH
(Continued)

RRC state. Related user equipment nodes, radio access nodes and methods are disclosed.

20 Claims, 6 Drawing Sheets

(58) Field of Classification Search
CPC ....... H04W 4/00; H04W 72/04; H04W 68/00; H04W 28/04; H04W 72/0413; H04W 52/143; H04W 72/08; H04L 12/28; H04L 5/003; H04L 1/0026; H04L 1/1671; H04L 1/1829; H04L 1/0003; H04L 1/009; H04L 1/0038; H04L 5/0053
USPC .......................................................... 370/329
See application file for complete search history.

(56) References Cited

U.S. PATENT DOCUMENTS

| | | | | |
|---|---|---|---|---|
| 8,185,116 B2* | 5/2012 | Wu | .................... | H04W 36/0088 455/436 |
| 8,428,025 B2* | 4/2013 | Hannu | .................. | H04W 76/27 370/329 |
| 8,934,442 B2* | 1/2015 | Lee | ....................... | H04W 52/18 370/329 |
| 9,008,023 B2* | 4/2015 | Khay-Ibbat | ........... | H04W 68/00 370/329 |
| 9,167,565 B2* | 10/2015 | Lee | .................... | H04W 72/0413 |
| 9,220,126 B2* | 12/2015 | Ericson | ................. | H04W 76/27 |
| 9,357,466 B2* | 5/2016 | Pani | ....................... | H04L 1/1671 |
| 9,479,974 B2* | 10/2016 | Pani | ....................... | H04W 24/10 |
| 9,838,922 B2* | 12/2017 | Pelletier | ............ | H04W 36/0058 |
| 10,511,960 B2* | 12/2019 | Cave | .................... | H04W 68/02 |
| 2011/0195715 A1 | 8/2011 | Wu | | |
| 2014/0204845 A1 | 7/2014 | Khay-Ibbat | | |

OTHER PUBLICATIONS

Huawei et al., 3GPP TSG-RAN WG2 Meeting #97, R2-1702254, "Introduction of QoE Measurement Collection for streaming services," Athens, Greece, Feb. 13-17, 2017, 3 pages.

Ericsson, 3GPP TSB RAN WG2 #97, R2-1701604, "Open issues for QoE measurement collection," Athens, Greece, Feb. 13-17, 2017, 4 pages.

Kreher, Ralf, "Selected UMTS Key Performance Parameters", in UMTS Performance Measurement, John Wiley & Sons, Incorporated, Nov. 6, 2006, pp. 61-180.

3GPP TS 25.331 v14.2.0 (Mar. 2017) (ETSI TS 125 331 v14.2.0—Apr. 2017); $3^{rd}$ Generation Partnership Project; Technical Specification Radio Access Network; Radio Resource Control (RRC); Protocol specification (Release 14); 2372 pages (specific reference to Section 10.3.3.3, p. 852).

Renesas Mobile Europe Ltd, 3GPP TSG RAN WG2 Meeting #78, R2-122628, "Enhanced Network Control of Mobility of CELL_FACH," Prague, Czech Republic, May 21-25, 2012.

3GPP TS 26.247 v14.0.0 (Dec. 2016); $3^{rd}$ Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 14), 101 pages.

3GPP TS 25.331 v14.0.0 (Sep. 2016); $3^{rd}$ Generation Partnership Project; Technical Specification Group Radio Access Network; Radio Resource Control (RRC); Protocol specification (Release 14), 2276 pages.

Notice of Allowance dated Jun. 28, 2021, Korean Patent Application No. 1020197031264, 2 pages.

"RAN3 impacts of QMC for streaming services," 3GPP TSG-RAN3 Meeting #94, Agenda Item 25, Huawei, R3-162916, Reno, Nevada, USA, Nov. 14-18, 2016, 8 pages.

\* cited by examiner

TRANSITIONING TO CELL DCH RRC STATE TO REPORT APPLICATION-LEVEL MEASUREMENT

CROSS REFERENCE TO RELATED APPLICATIONS

This application is a 35 U.S.C. § 371 national stage application of PCT International Application No. PCT/SE2017/051045 filed on Oct. 25, 2017, which in turn claims domestic priority to U.S. Provisional Patent Application No. 62/476,576 filed on Mar. 24, 2019, the disclosures and content of which are incorporated by reference herein in their entirety.

TECHNICAL FIELD

The present disclosure relates to generally relates to the field of communications, and more particularly, to methods and nodes providing wireless network communications.

BACKGROUND

In 3GPP release 14 there is a work item for "Quality of Experience (QoE) Measurement Collection" for the Universal Mobile Telecommunications System (UMTS). A corresponding work item is approved for Long Term Evolution (LTE) in release 15 and will also be applicable for the New Radio (NR) specification. The purpose of the work item is to start measurements in a user equipment (UE) node to collect information about the quality of streaming services used in the UE node. The streaming service is typically a 3rd party streaming application on top of a packet switched interactive radio access bearer defined in the radio access network (RAN). The purpose of the measurement collection is to be able to improve the quality of the streaming service.

The radio resource control (RRC) protocol will be used to start the measurements in the UE and to transmit the result back from the UE. The resulting data file may be extracted in the radio access network (RAN) for possible improvements in the RAN.

The measurements may be initiated directly from an operation and maintenance (O&M) node for a group of UEs. The measurements may also be initiated in response to receiving a "trace request" from the core network (CN). The measurement report, which includes the measurement details, is encapsulated in a report container that is transparent to the RAN and to the trace collection entity to which the collected measurements may be sent. The RAN starts the measurements in the UE by sending the configuration information transparently to the UE. The configuration information typically includes a Dynamic Adaptive Streaming Over HTTP (DASH) file specifying the data to be collected. An example of end-to-end signaling flow for configuring and reporting the measurements is shown in FIG. 1.

Referring to FIG. 1, a measurement request may be initiated, for example, by an operations support system (OSS) node. The measurement request is sent to a radio network controller (RNC) in the RAN. The RNC causes an eNodeB base station (eNB) to transmit the measurement request to the UE using a radio resource control (RRC) protocol.

At the UE, the measurement request is processed by a DASH client, which makes the appropriate measurements of QoE and builds a measurement report. The UE transmits the measurement report back to the RNC in an RRC message. The RNC may then send the measurement report to a trace collection entity (TCE) node within the RAN, which may forward the measurement results to a QoE server for processing.

Currently only QoE measurements for streaming services have been included in the specifications, but in later releases other types of application layer measurements may be added.

The Radio Resource Control (RRC) protocol is a protocol layer that exists between the UE and the eNB. The RRC protocol is used to facilitate various control functions, including but not limited to connection establishment and release, broadcast of system information, radio bearer establishment, connection mobility, paging notification and power control. The RRC protocol is used to configure the user and control planes, and allows for Radio Resource Management strategies to be implemented.

The RRC protocol defines certain specific states (also referred to as RRC states) that a UE may have. For example, possible RRC states that the UE may have include CELL_DCH (Dedicated Channel), CELL_FACH (Forward Access Channel), CELL_PCH (Cell Paging Channel) and URA_PCH (URA Paging Channel). The terms "state" and "RRC state" are used herein interchangeably. Thus, for example, the CELL_DCH RRC state may be referred to as simply the "CELL_DCH state" or simply "CELL_DCH."

Depending on its state, a UE may use different amounts of radio resources. Since different amounts of resources are available at different states, the capabilities of a UE, such as its transmission rate, are affected by its current state. In general, the radio resources available to a UE in the CELL_DCH state are greater than those available to the UE in other states, and the power consumption in the CELL_DCH state is consequently higher than in other states.

A current approach for obtaining QoE measurement reports is specified in terms of existing RRC measurement procedures. The configuration information is carried in a MEASUREMENT CONTROL message in the form of a transparent container. The measurement results are carried in a MEASUREMENT REPORT message, also in the form of a transparent container. The RAN is responsible for relaying the results transparently to the trace collection entity. The size of the report container can be quite large, and therefore it has been specified that the UE can only transmit the report when in the CELL_DCH RRC state where the transmission rate is high. The UE is not allowed to transmit the report in low-activity RRC states, such as the CELL_FACH, CELL_PCH, or URA_PCH RRC states. For example, transmitting the measurement report while in the CELL_FACH RRC state may take a very long time and may cause various problems, such as stalling of buffers, time-outs etc.

There are existing protocols for triggering upswitches to the CELL_DCH RRC state when the UE has a large amount of user plane data to send. However, as the application layer measurement report is transmitted in the control plane, there is presently no mechanism for handling such a case.

Approaches described in this Background description could be pursued, but are not necessarily approaches that have been previously conceived or pursued. Therefore, unless otherwise indicated herein, the approaches described in the Background section are not prior art to the inventive embodiments disclosed in this application and are not admitted to be prior art by inclusion in the Background section.

SUMMARY

According to some embodiments, a method may be provided to operate a user equipment (UE). The method may include receiving a request from a radio access network for a measurement report for an application operating at a layer above a radio resource control, RRC, protocol layer; generating the measurement report in response to the request; and determining a current RRC connected state of the UE when the measurement report is ready to be sent. In response to determining that the current RRC connected state of the UE is not a CELL_DCH RRC state, the method includes sending a cell update message to the radio access network; receiving instructions from the radio access network to transition to the CELL_DCH RRC state; transitioning to the CELL_DCH RRC state; and transmitting the measurement report while the UE is in the CELL_DCH RRC state.

According to further embodiments, a method may be provided to operate a radio access network node. The method may include transmitting a request for a measurement report to a user equipment, UE, node, for an application operating in the UE at a layer above a radio resource control, RRC, protocol layer of the UE; receiving a cell update message from the UE, wherein the cell update message indicates that the UE has the measurement report available to send; transmitting instructions to the UE instructing the UE to transition to a CELL_DCH RRC state; and receiving the measurement report from the UE while the UE is in the CELL_DCH RRC state.

Further embodiments provide a user equipment, UE, node that is adapted to perform operations including: receiving a request from a radio access network for a measurement report for an application operating at a layer above a radio resource control, RRC, protocol layer; generating the measurement report in response to the request; determining a current RRC connected state of the UE when the measurement report is ready to be sent; in response to determining that the current RRC connected state of the UE is not a CELL_DCH RRC state, sending a cell update message to the radio access network; receiving instructions from the radio access network to transition to the CELL_DCH RRC state; transitioning to the CELL_DCH RRC state; and transmitting the measurement report while the UE is in the CELL_DCH RRC state. Some further embodiments provide a radio access network, RAN, node, wherein the RAN node is adapted to perform operations including: transmitting a request for a measurement report to a user equipment, UE, node, for an application operating in the UE at a layer above a radio resource control, RRC, protocol layer of the UE; receiving a cell update message from the UE, wherein the cell update message indicates that the UE has the measurement report available to send; transmitting instructions to the UE instructing the UE to transition to a CELL_DCH RRC state; and receiving the measurement report from the UE while the UE is in the CELL_DCH RRC state.

Some further embodiments provide a user equipment, UE, node, including a transceiver configured to provide wireless communication over a radio interface; and a processor coupled with the transceiver. The processor is configured to provide communication with a radio access network, RAN, node through the transceiver. The processor is configured to perform operations including: receiving a request from a radio access network for a measurement report for an application operating at a layer above a radio resource control, RRC, protocol layer; generating the measurement report in response to the request; determining a current RRC connected state of the UE when the measurement report is ready to be sent; in response to determining that the current RRC connected state of the UE is not a CELL_DCH RRC state, sending a cell update message to the radio access network; receiving instructions from the radio access network to transition to the CELL_DCH RRC state; transitioning to the CELL_DCH RRC state; and transmitting the measurement report while the UE is in the CELL_DCH RRC state.

Some further embodiments provide a radio access network, RAN, node, including: a network interface configured to provide communications over a network; and a processor coupled with the network interface. The processor is configured to provide communication with a user equipment (UE) node through the network interface. The processor is configured to perform operations including: transmitting a request for a measurement report to a user equipment, UE, node, for an application operating in the UE at a layer above a radio resource control, RRC, protocol layer of the UE; receiving a cell update message from the UE, wherein the cell update message indicates that the UE has the measurement report available to send; transmitting instructions to the UE instructing the UE to transition to a CELL_DCH RRC state; and receiving the measurement report from the UE while the UE is in the CELL_DCH RRC state. The RAN node may be any RAN node, including an eNodeB (base station) node, a radio network controller node, or other node.

Some further embodiments provide a user equipment, UE, node, comprising: a receiving module that configures the UE to receive a request from a radio access network for a measurement report for an application operating at a layer above a radio resource control, RRC, protocol layer; a measurement module that configures the UE to generate the measurement report in response to the request; an RRC control module that configures the UE to (a) determine a current RRC connected state of the UE when the measurement report is ready to be sent, (b) in response to determining that the current RRC connected state of the UE is not a CELL_DCH RRC state, send a cell update message to the radio access network, (c) receive instructions from the radio access network to transition to the CELL_DCH RRC state and (d) transition to the CELL_DCH RRC state; and a transmitting module that configures the UE to transmit the measurement report while the UE is in the CELL_DCH RRC state.

Some further embodiments provide a radio access network, RAN, node, comprising: a transmitting module that configures the RAN node to transmit a request for a measurement report to a user equipment, UE, node, for an application operating in the UE at a layer above a radio resource control, RRC, protocol layer of the UE; a receiving module that configures the RAN node to receive a cell update message from the UE, wherein the cell update message indicates that the UE has the measurement report available to send; and an RRC control module that generates instructions to the UE instructing the UE to transition to a CELL_DCH RRC state in response to the cell update message; wherein the transmitting module transmits the instructions to the UE and the receiving module receives the measurement report from the UE while the UE is in the CELL_DCH RRC state.

Some further embodiments provide a method in a user equipment, UE, including: receiving a request from a radio access network for a measurement report for an application operating at a layer above a radio resource control, RRC, protocol layer; generating the measurement report in response to the request; determining a current state of the UE when the measurement report is ready to be sent; in response to determining that the current state of the UE is not a state in which the UE is authorized to transmit the measurement report to the radio access network, sending a cell update message to the radio access network; receiving instructions from the radio access network to transition to the state in which the UE is authorized to transmit the measurement report to the radio access network; transitioning to the state in which the UE is authorized to transmit the measurement report to the radio access network; and transmitting the measurement report while the UE is in the state in which the UE is authorized to transmit the measurement report to the radio access network.

Some further embodiments provide a user equipment, UE, node, including: a transceiver configured to provide wireless communication over a radio interface; and a processor coupled with the transceiver, wherein the processor is configured to provide communication with a radio access network, RAN, node through the transceiver. The processor is configured to perform operations including: receiving a request from a radio access network for a measurement report for an application operating at a layer above a radio resource control, RRC, protocol layer; generating the measurement report in response to the request; determining a current state of the UE when the measurement report is ready to be sent; in response to determining that the current state of the UE is not a state in which the UE is authorized to transmit the measurement report to the radio access network, sending a cell update message to the radio access network; receiving instructions from the radio access network to transition to the state in which the UE is authorized to transmit the measurement report to the radio access network; transitioning to the state in which the UE is authorized to transmit the measurement report to the radio access network; and transmitting the measurement report while the UE is in the state in which the UE is authorized to transmit the measurement report to the radio access network.

Some further embodiments provide a method in a radio access network, RAN, node including: transmitting a request for a measurement report to a user equipment, UE, node, for an application operating in the UE at a layer above a radio resource control, RRC, protocol layer of the UE; receiving a cell update message from the UE, wherein the cell update message indicates that the UE has the measurement report available to send; transmitting instructions to the UE instructing the UE to transition to a state in which the UE is authorized to transmit the measurement report to the radio access network; and receiving the measurement report from the UE while the UE is in the state in which the UE is authorized to transmit the measurement report to the radio access network.

Some further embodiments provide a radio access network, RAN, node, including: a network interface configured to provide communications over a radio access network; and a processor coupled with the network interface, wherein the processor is configured to provide communication with a user equipment (UE) node through the network interface. The processor is configured to perform operations including: transmitting a request for a measurement report to a user equipment, UE, node, for an application operating in the UE at a layer above a radio resource control, RRC, protocol layer of the UE; receiving a cell update message from the UE, wherein the cell update message indicates that the UE has the measurement report available to send; transmitting instructions to the UE instructing the UE to transition to a state in which the UE is authorized to transmit the measurement report to the radio access network; and receiving the measurement report from the UE while the UE is in the state in which the UE is authorized to transmit the measurement report to the radio access network.

DETAILED DESCRIPTION

Figure 1:
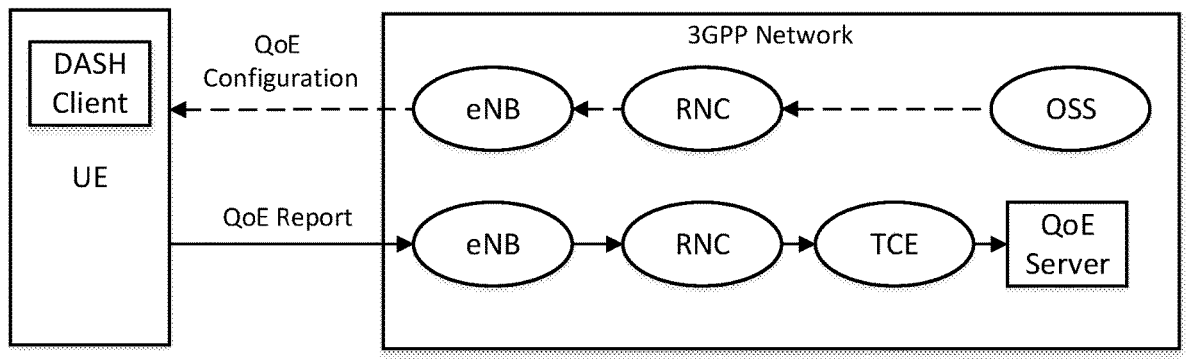
FIG. 1 illustrates initiation of a measurement request.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be assumed to be present/used in another embodiment unless expressly precluded.

As noted above, a UE may be asked by a RAN to provide an application layer measurement report, such as a Quality of Experience, QoE, measurement report. Such reports are encapsulated in containers, referred to as report containers.

Due to the large size of the report container, it has been specified that the UE can only transmit the measurement report when it is in the CELL_DCH RRC state. That approach assumes that the UE uses the streaming application while in the CELL_DCH RRC state, and that when the session ends there is some time before a downswitch to the CELL_FACH RRC state is triggered due to UE inactivity. During the time before the downswitch, the UE can transmit the report while it is still in the CELL_DCH RRC state. However, it is possible for the UE to be switched down to the CELL_FACH state (or another lower activity state) during the streaming session for some reason, such network congestion. The UE may then receive the measurement report from an upper layer (e.g., a protocol layer above the RRC protocol layer) when it is in the CELL_FACH state. It could also happen that the UE has been switched down to a state other than the CELL_DCH state due to inactivity before the report is received from an upper layer. There is currently no specification for how the UE should act when it has a measurement report to send but is in a CELL_FACH, CELL_PCH, or URA_PCH state.

Some embodiments described herein enable a UE that is not currently in the CELL_DCH state to signal to the network that it has an application layer measurement report to transmit. According to some embodiments, a UE may initiate a Cell Update procedure using a special cause value and/or by providing a special information element (IE) in an RRC Cell Update message.

Accordingly, some embodiments provide a user equipment, UE, node, including a transceiver configured to provide wireless communication over a radio interface; and a processor coupled with the transceiver, wherein the processor is configured to perform operations including: receiving a request from a radio access network for a measurement report for an application operating at a layer above a radio resource control, RRC, protocol layer; generating the measurement report in response to the request; determining a current RRC connected state of the UE when the measurement report is ready to be sent; in response to determining that the current RRC connected state of the UE is not a CELL_DCH RRC state, sending a cell update message to the radio access network; receiving instructions from the radio access network to transition to the CELL_DCH RRC state; transitioning to the CELL_DCH RRC state; and transmitting the measurement report while the UE is in the CELL_DCH RRC state.

Some embodiments described herein may make it possible for a UE to transmit an application layer measurement report to the RAN when it is received at the RRC protocol layer while the UE is not in the CELL_DCH state. As a result, statistics collected from the measurement reports may be improved, as they may no longer be biased due to missing reports. Reports received after the UE has been switched down to a low activity RRC state due to congestion, for example, are more likely to indicate bad quality than good. Thus, there is a large incentive for such reports to be transmitted successfully. Moreover, problems caused by large reports clogging up UE buffers while waiting to be transmitted can potentially be avoided.

Although described herein primarily in the context of a QoE measurement report, it will be appreciated that embodiments described herein can be used to process any application layer measurement report that a UE may need to send to the RAN.

When an application layer measurement (such as a QoE measurement) has been completed, the report container for the application layer measurement is sent from an upper protocol layer, such as the application layer, to the access stratum layer in the UE where the RRC protocol resides. When the application layer sends the application layer measurement report, the application layer does not know which RRC state the UE is in. As currently specified, the UE is only allowed to send the report when it is in CELL_DCH state. There is no provision for how the UE should act if it receives a report while in another state, or if a report is available but has not been sent when a reconfiguration message causing the UE transition to a different state is received.

One approach to address this problem is for the arrival of the application layer measurement at the access layer stratum to trigger an RRC event. The UE can then use existing mechanisms to inform the network of the triggering of the event. This method, however, has certain drawbacks. For example, the arrival of the application layer measurement report is currently not systemized as an RRC event. Instead, it directly triggers the transmission of a Measurement Report message that carries the application layer report. Thus, the current reporting procedure would need to be refitted with an RRC event.

Moreover, according to the RRC protocol, the UE informs the network of an RRC event using a Measurement Report message. The mechanism for transmitting this report is different depending on the UE's RRC state. In the CELL_DCH state, the Measurement Report messages for carrying the RRC event and the application layer report may be combined into one message. In the CELL_FACH state, the RRC event must be transmitted in a separate message. In the CELL_PCH and URA_PCH states, a Cell Update message (or a specialized Measurement Report message) must be transmitted first. The RRC event may be incorporated into the Cell Update message or sent in a stand-alone Measurement Report message after the transmission of the Cell Update.

Some embodiments described herein may avoid affecting the existing behavior of the UE while in the CELL_DCH state and/or may reduce the effect on the various RRC procedures mentioned above. In particular, some embodiments of the inventive concepts may use a Cell Update message to indicate that an application layer measurement report has arrived in the UE when the UE is in an RRC state other than the CELL_DCH RRC state, such as the CELL_FACH RRC state. The indication may, in some embodiments, be implemented as a cause value in the Cell Update message that indicates that the UE has an application layer measurement report to send. When the network receives the Cell Update message, it may reply back to the UE with a Cell Update Confirm message containing configuration parameters for the UE to transition to the CELL_DCH RRC state.

A cell update procedure may serve several purposes. For example, a cell update procedure may be used to notify UTRAN after the UE re-enters a service area in the URA_PCH or CELL_PCH RRC state, to notify UTRAN of an RLC unrecoverable error on an AM RLC entity, and/or to be used as a supervision mechanism in the CELL_FACH or CELL_PCH RRC state by means of periodic update. In addition, the cell update procedure may serve to update UTRAN with the current cell the UE is camping on after cell reselection, to act on a radio link failure in the CELL_DCH state, to act on the transmission failure of the UE CAPABILITY INFORMATION message, to notify UTRAN of a transition from the URA_PCH or CELL_PCH state to the CELL_FACH state due to the reception of UTRAN originated paging or due to a request to transmit uplink data, and/or to establish and handle MBMS services.

A Cell Update message may include a cell update cause value, or cell update cause, such as cell reselection, periodic cell update, uplink data transmission, paging response, re-entered service area, radio link failure, RLC unrecoverable error, MBMS reception, and/or MBMS ptp RB request.

The content of the Cell Update message is currently defined in Section 10.2.7 of 3GPP TS 25.331-Radio Resource Control (RRC), see e.g. 3GPP TS 25.331 v14.0.0.

Figure 2:
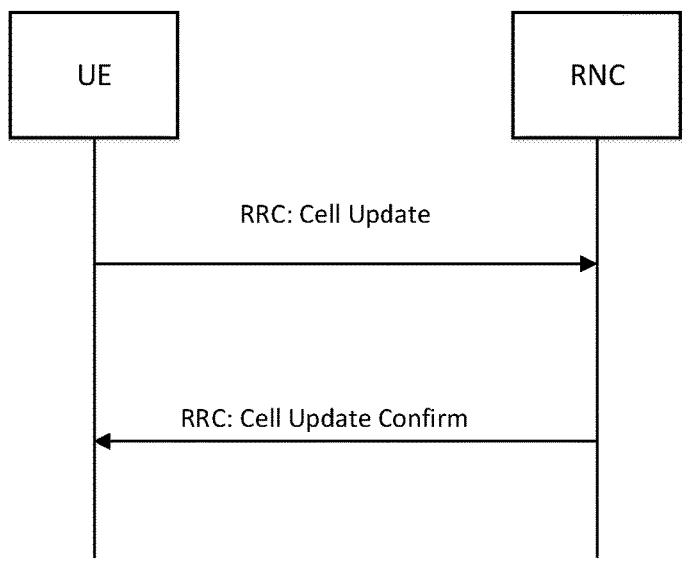
FIG. 2 illustrates the RRC Cell Update message that is transmitted by a UE to an RNC in the RAN.

FIG. 2 illustrates the RRC Cell Update message that is transmitted by a UE to an RNC in the RAN. The RNC replies with a Cell Update Confirm message that provides the configuration parameters needed by the UE to transition to a new RRC state, such as the CELL_DCH RRC state.

There are currently a number of cause values that can be included in a Cell Update message. According to some embodiments, a new cause value for "application layer measurement report available" or the like may be defined. This new cause value informs the network that the UE has an application layer measurement report that it needs to send. The network can then send an answer with the RRC message Cell Update Confirm to the UE with the necessary information for the UE to transition to the CELL_DCH RRC state. An example of a new cause value for "application layer measurement report available" is illustrated in Table 1, below.

TABLE 1

New Cell Update Cause Value

| Information Element/ Group name | Need | Multi | Type and reference | Semantics description | Version |
|---|---|---|---|---|---|
| Cell update cause | MP | | Enumerated (cell reselection, periodical cell update, uplink data transmission, paging response, reentered service area, radio link failure, RLC unrecoverable error, MBMS reception, MBMS ptp RB request) | One spare value is needed. | REL-6 |
| | | | application layer measurement report available | | REL-14 |

In other embodiments, the indication that the UE has an application layer measurement report to send may be added as a separate information element (IE) in the Cell Update message.

In still other embodiments, an indication that the UE has an application layer measurement report to send may be added in another RRC message, such as a Measurement Report. The transfer to the CELL_DCH RRC state may then be done using the RRC message Radio Bearer Reconfiguration instead.

Embodiments of the inventive concepts may be applied to other specifications, such as LTE or NR. For example, although there are currently only two RRC states defined in LTE, an inactive state called "light connection" is under development for both LTE and NR. Embodiments of the inventive concepts may be advantageously employed to enable a UE in the "light connection" state to request a transition to a more active state for transmission of an application layer report.

Figure 3:
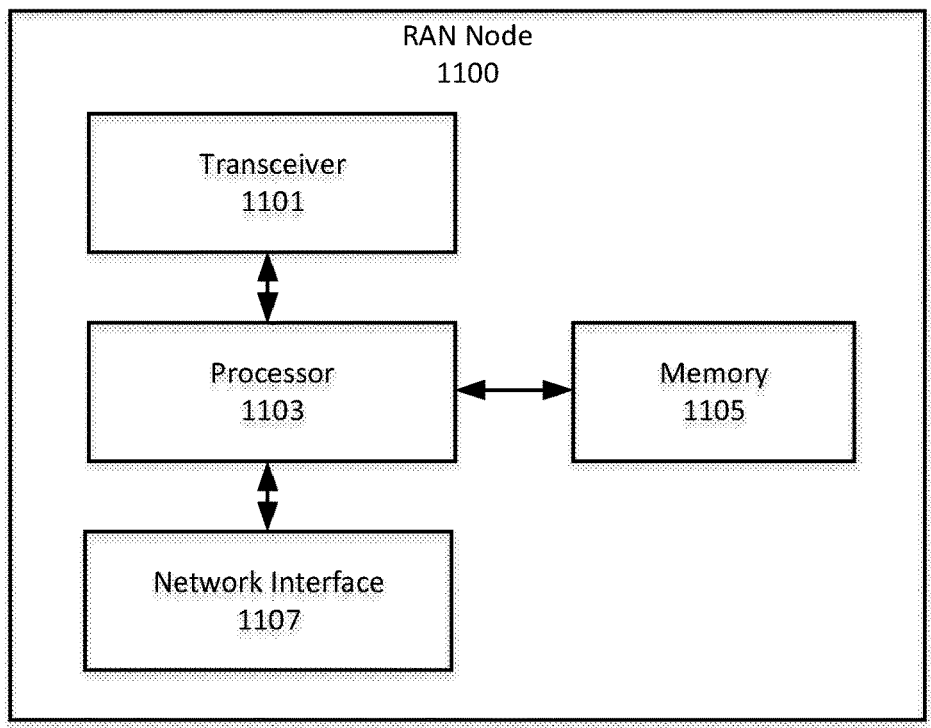
FIG. 3 is a block diagram illustrating a radio access network, RAN, node according to some embodiments.

FIG. 3 is a block diagram illustrating a RAN node 1100 according to some embodiments disclosed herein. The RAN node 1100 may include any node in a radio access network, including for example a base station, eNodeB, radio network controller, or other node. As shown, the RAN node 1100 may include a processor 1103 coupled with a network interface 1107, and a memory 1105.

The RAN node 1100 may optionally include a transceiver 1101, which may include one or more of a cellular radio access network (RAN) interface (also referred to as a RAN transceiver) and/or other wireless network communication interface. The RAN node 1100 may thus be configured to perform wireless communication over one or more radio links with one or more mobile communication devices.

The network interface 1107 may provide communication with other network nodes/devices within or outside the RAN. The processor 1103 (also referred to as a processor circuit or processing circuitry) may include one or more data processing circuits, such as a general purpose and/or special purpose processor (e.g., microprocessor and/or digital signal processor). The processor 1103 may be configured to execute computer program instructions from functional modules in the memory 1105 (also referred to as a memory circuit or memory circuitry), described below as a computer readable medium, to perform some or all of the operations and methods that are described herein for one or more of the embodiments. Moreover, the processor 1103 may be defined to include memory so that a separate memory 1105 may not be required.

Figure 4:
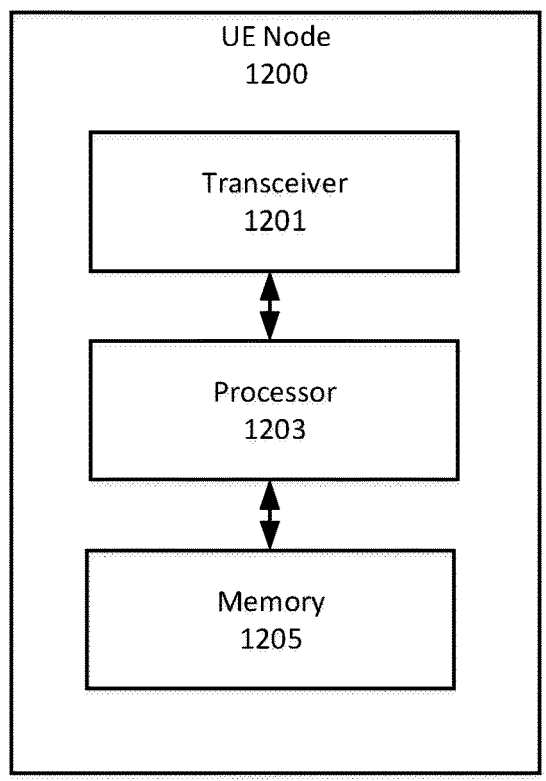
FIG. 4 is a block diagram illustrating a user equipment, UE, node according to some embodiments.

FIG. 4 is a block diagram illustrating a user equipment (UE) node 1200 according to some embodiments disclosed herein. As shown, the UE node 1200 may include a processor 1203 coupled with a transceiver 1201 and a memory 1205.

The transceiver 1201 may include one or more of a cellular radio access network (RAN) interface (also referred to as a RAN transceiver) and/or other wireless network communication interface. The UE node 1200 may thus be configured to perform wireless communication over one or more radio links with one or more mobile communication devices and/or RAN nodes.

The processor 1203 (also referred to as a processor circuit or processing circuitry) may include one or more data processing circuits, such as a general purpose and/or special purpose processor (e.g., microprocessor and/or digital signal processor). The processor 1203 may be configured to execute computer program instructions from functional modules in the memory 1205 (also referred to as a memory circuit or memory circuitry), described below as a computer readable medium, to perform some or all of the operations and methods that are described herein for one or more of the embodiments. Moreover, the processor 1203 may be defined to include memory so that a separate memory 1205 may not be required.

Operations of a UE 1200 will now be discussed with reference to the flow chart of FIG. 5 and the modules of FIG. 6 according to some embodiments of inventive concepts. For example, modules of FIG. 6 may be stored in memory 1205 of FIG. 4, and these modules may provide instructions so that when the instructions of a module are executed by the processor 1203, the processor 1203 performs respective operations of the flow chart of FIG. 5. As shown in FIG. 6, the modules in the memory 1205 may include a receiving module 1220, a measurement module 1222, an RRC control module 1224 and a transmitting module 1226. In general, the receiving module 1220 controls the reception of data by the transceiver 1201 over a wireless air interface, the measurement module 1222 generates measurement data, such as application layer measurement data, and generates measurement reports, such as application layer measurement reports, the RRC control module 1224 controls RRC functions of the UE 1200, and the transmitting module 1226 controls the transmission of data by the transceiver 1201 over the wireless air interface.

Figure 5:
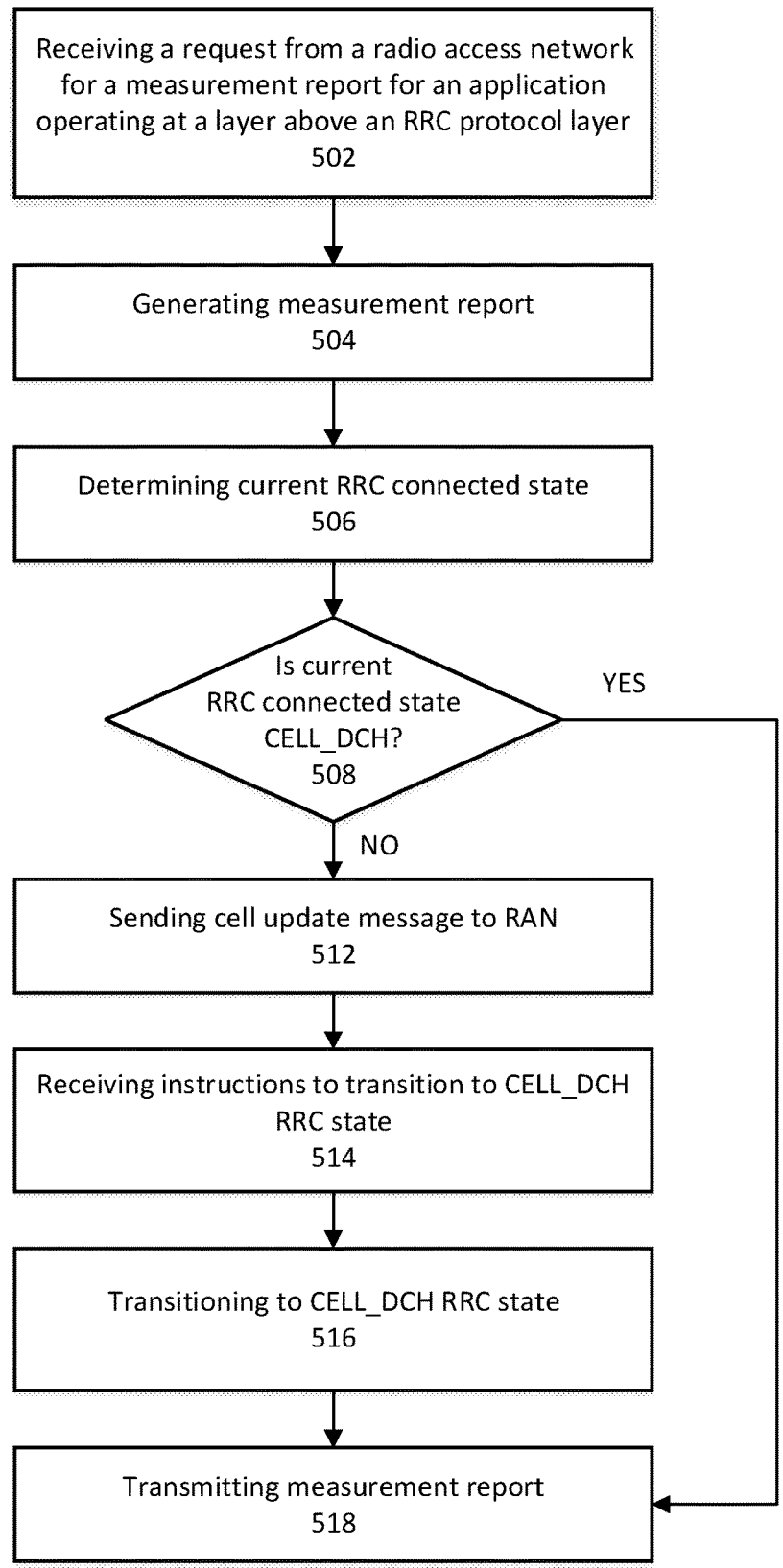
FIG. 5 is a flow chart illustrating operations of a UE node according to some embodiments.
Figure 6:
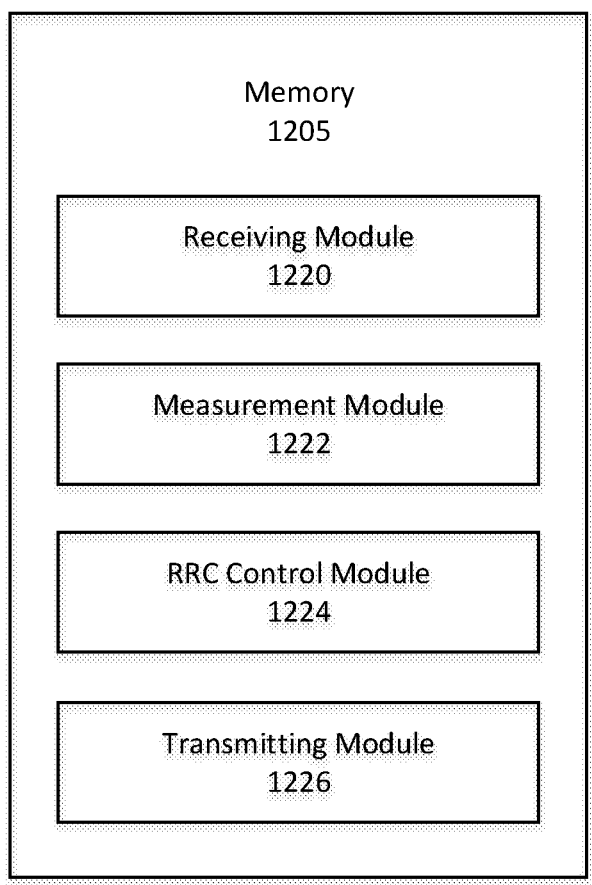
FIG. 6 is a block diagram illustrating functional modules in a memory of a UE node according to some embodiments.

Operations of the UE 1200 are illustrated in the flow chart of FIG. 5 according to some embodiments of inventive concepts. At block 502, the processor 1203 of the UE 1200 may receive a request from a radio access network for an application layer measurement report for an application operating at a layer (e.g., the application layer) above the RRC protocol layer, for example, using the receiving module 1220. For example, the processor 1203 may receive a request for a QoE report related to QoE of a streaming application according to a QoE measurement configuration provided by the RAN.

At block 504, the processor 1203 may generate the measurement report in response to the request using, for example, the measurement module 1222. The measurement module 1222 may be part of a larger application module, or may be a different module operating at the application layer or any other layer higher than the RRC protocol layer.

At block 506, when the measurement report is ready to be sent, the processor 1203 may determine a current RRC connected state of the UE, using, for example, the RRC control module 1224. At block 508, the processor 1203 then checks to see if the current RRC connected state of the UE is a CELL_DCH RRC state. If the current RRC connected state of the UE is determined to be a CELL_DCH RRC state, operations proceed to block 518 where the processor 1203 transmits the measurement report using, for example, the transmitting module 1226. If the current RRC connected state of the UE is determined at block 508 not to be a CELL_DCH RRC state, operations proceed to block 512 where the processor 1203 sends a cell update message to the radio access network using, for example, the transmitting module 1226. It will be appreciated that sending the cell update message may be performed under control of the RRC control module 1224.

At block 514, the processor 1203 receives instructions from the radio access network to transition to the CELL_DCH RRC state using, for example, the receiving module 1220. At block 516, the processor 1203 then causes the UE to transition to the CELL_DCH RRC state using, for example, the RRC control module 1224. At block 518, the processor 1203 may then transmit the measurement report while the UE is in the CELL_DCH RRC state to the RAN using, for example, the transmitting module 1226.

Operations of a RAN node 1100 will now be discussed with reference to the flow chart of FIG. 7 and the modules of FIG. 8 according to some embodiments of inventive concepts. For example, modules of FIG. 8 may be stored in memory 1105 of FIG. 3, and these modules may provide instructions so that when the instructions of a module are executed by the processor 1103, the processor 1103 performs respective operations of the flow chart of FIG. 7. As shown in FIG. 8, the modules in the memory 1105 may include a receiving module 1120, an RRC control module 1124 and a transmitting module 1126. In general, the receiving module 1120 controls the reception of data by the transceiver 1101 over a wireless air interface and/or reception of data by the network interface 1107, the RRC control module 1124 controls RRC functions of a UE managed by the RAN node 1100, and the transmitting module 1126 controls the transmission of data by the transceiver 1101 and/or the network interface 1107.

Figure 7:
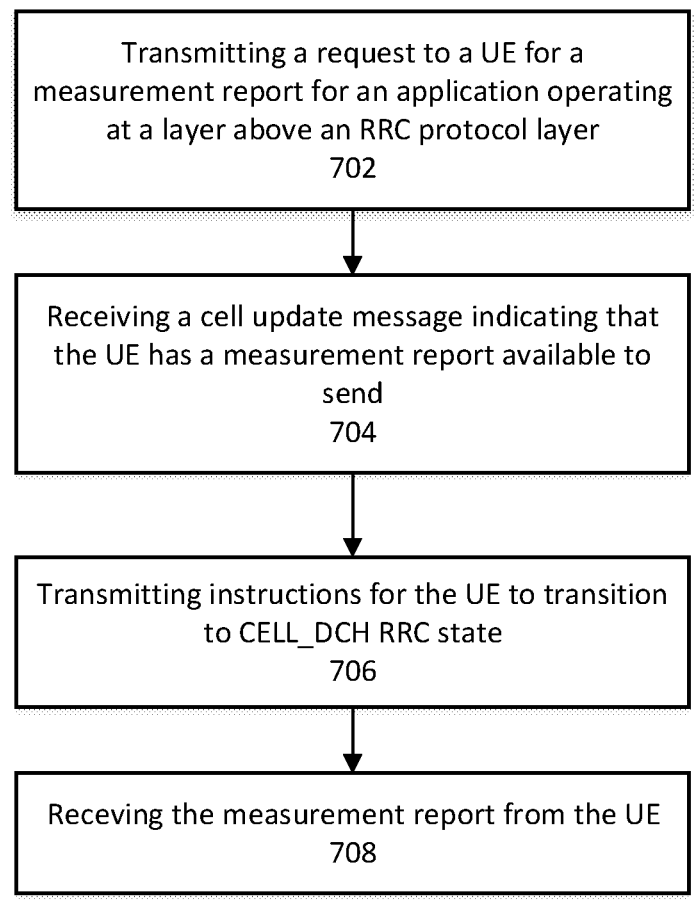
FIG. 7 is a flow chart illustrating operations of a RAN node according to some embodiments.
Figure 8:
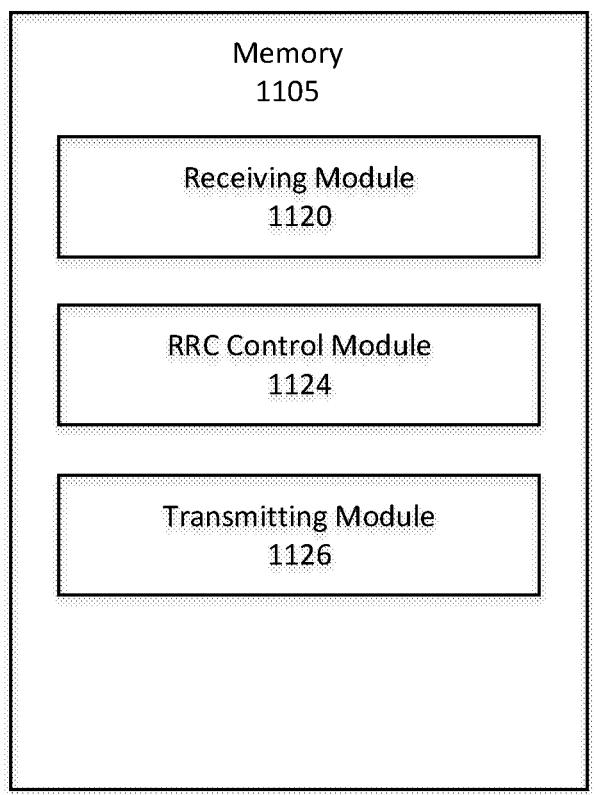
FIG. 8 is a block diagram illustrating functional modules in a memory of a RAN node according to some embodiments.

Operations of the RAN node 1100 are illustrated in the flow chart of FIG. 7 according to some embodiments of inventive concepts. At block 702, the processor 1103 of the RAN node 1100 may transmit a request for a measurement report to a UE for an application operating in the UE at a layer above the RRC protocol layer of the UE (e.g., the application layer), for example, using the transmitting module 1126. For example, the processor 1103 may transmit to the UE a request for a QoE report according to a QoE measurement configuration provided by the RAN.

At block 704 the processor 1103 may receive a cell update message from the UE, wherein the cell update message indicates that the UE has the measurement report available to send, using, for example, the receiving module 1120.

At block 706 the processor 1103 may transmit instructions to the UE instructing the UE to transition to a CELL_DCH RRC state using, for example, the RRC control module 1124 to control the transmitting module 1126.

At block 708, the processor 1103 may receive the measurement report from the UE while the UE is in the CELL_DCH RRC state using, for example, the receiving module 1120.

EXAMPLE EMBODIMENTS

Embodiment 1. A method in a user equipment, UE, comprising:
  receiving a request from a radio access network for a measurement report for an application operating at a layer above a radio resource control, RRC, protocol layer;
  generating the measurement report in response to the request;
  determining a current RRC connected state of the UE when the measurement report is ready to be sent;
  if the current RRC connected state of the UE is not a CELL_DCH RRC state, sending a cell update message to the radio access network;
  receiving instructions from the radio access network to transition to the CELL_DCH RRC state;
  transitioning to the CELL_DCH RRC state; and
  transmitting the measurement report while the UE is in the CELL_DCH RRC state.

Embodiment 2. The method of Embodiment 1, wherein sending the cell update message comprises sending the cell update message if the current RRC connected state of the UE is a CELL_FACH RRC state, a URA_PCH RRC state or a CELL_PCH RRC state.

Embodiment 3. The method of any previous Embodiment, wherein the cell update message comprises a cause value that indicates that the UE has the measurement report available to send.

Embodiment 4. The method of any previous Embodiment, wherein the cell update message comprises an information element, IE, that indicates that the UE has the measurement report available to send.

Embodiment 5. The method of any previous Embodiment, wherein the measurement report comprises a quality of experience, QoE, measurement report.

Embodiment 6. The method of any previous Embodiment, wherein the instructions from the radio access network to transition to the CELL_DCH RRC state comprise a cell update confirm message.

Embodiment 7. The method of any previous Embodiment, wherein the measurement report comprises an application layer measurement report.

Embodiment 8. The method of any previous Embodiment, wherein the request is received via an RRC protocol message.

Embodiment 9. The method of Embodiment 1, wherein the sending the cell update message comprises sending the cell update message using an RRC protocol.

Embodiment 10. A user equipment, UE, node (1200), comprising:
  a transceiver (1201) configured to provide wireless communication over a radio interface; and
  a processor (1203) coupled with the transceiver, wherein the processor is configured to provide communication with a radio access network, RAN, node through the transceiver, and wherein the processor is configured to perform operations according to any of Embodiments 1-9.

Embodiment 11. A user equipment, UE, node (1200), wherein the UE node is adapted to perform according to any of Embodiments 1-9.

Embodiment 12. A method in a radio access network, RAN, node comprising:

transmitting a request for a measurement report to a user equipment, UE, node, for an application operating in the UE at a layer above a radio resource control, RRC, protocol layer of the UE;

receiving a cell update message from the UE, wherein the cell update message indicates that the UE has the measurement report available to send;

transmitting instructions to the UE instructing the UE to transition to a CELL_DCH RRC state; and receiving the measurement report from the UE while the UE is in the CELL_DCH RRC state.

Embodiment 13. The method of Embodiment 12, wherein the cell update message comprises a cause value that indicates that the UE has the measurement report available to send.

Embodiment 14. The method of any of Embodiments 12-13, wherein the cell update message comprises an information element, IE, that indicates that the UE has the measurement report available to send.

Embodiment 15. The method of any of Embodiments 12-14, wherein the measurement report comprises a quality of experience, QoE, measurement report.

Embodiment 16. The method of any of Embodiments 12-15, wherein the instructions to transition to the CELL_DCH RRC state comprise a cell update confirm message.

Embodiment 17. The method of any of Embodiments 12-16, wherein the measurement report comprises an application layer measurement report.

Embodiment 18. A radio access network, RAN, node (1100), comprising:
a network interface (1105) configured to provide communications over a network; and
a processor (1103) coupled with the network interface, wherein the processor is configured to provide communication with a user equipment (UE) node through the network interface, and wherein the processor is configured to perform operations according to any of Embodiments 12-17.

Embodiment 19. A radio access network, RAN, node (1100), wherein the RAN node is adapted to perform according to any of Embodiments 12-17.

Embodiment 20. A base station node (1100) of a radio access network, comprising:
a network interface (1105) configured to provide communications over a network;
a transceiver (1101); and
a processor (1103) coupled with the network interface and the transceiver, wherein the processor is configured to provide communication with a user equipment (UE) node through the transceiver, and wherein the processor is configured to perform operations according to any of Embodiments 12-17.

Embodiment 21. A base station node (1100) of a radio access network, wherein the RAN node is adapted to perform according to any of Embodiments 12-17.

Embodiment 22. A user equipment, UE, node (1200), wherein the UE node is adapted to perform operations comprising:
receiving (502) a request from a radio access network for a measurement report for an application operating at a layer above a radio resource control, RRC, protocol layer;
generating (504) the measurement report in response to the request;
determining (506) a current RRC connected state of the UE when the measurement report is ready to be sent;
in response to determining that the current RRC connected state of the UE is not a CELL_DCH RRC state, sending (512) a cell update message to the radio access network;
receiving (514) instructions from the radio access network to transition to the CELL_DCH RRC state;
transitioning (516) to the CELL_DCH RRC state; and
transmitting (518) the measurement report while the UE is in the CELL_DCH RRC state.

Embodiment 23. The UE node of Embodiment 22, wherein sending the cell update message comprises sending the cell update message if the current RRC connected state of the UE is a CELL_FACH RRC state, a URA_PCH RRC state or a CELL_PCH RRC state.

Embodiment 24. The UE node of any of Embodiments 22-23, wherein the cell update message comprises a cause value that indicates that the UE has the measurement report available to send.

Embodiment 25. The UE node of any of Embodiments 22-24, wherein the instructions from the radio access network to transition to the CELL_DCH RRC state comprise a cell update confirm message.

Embodiment 26. The UE node of any of Embodiments 22-25, wherein the measurement report comprises an application layer measurement report.

Embodiment 27. The UE node of any of Embodiments 22-26, wherein the request is received via an RRC protocol message.

Embodiment 28. The UE node of Embodiment 22, wherein the sending the cell update message comprises sending the cell update message using an RRC protocol.

Embodiment 29. A radio access network, RAN, node (1100), wherein the RAN node is adapted to perform operations comprising:
transmitting (702) a request for a measurement report to a user equipment, UE, node, for an application operating in the UE at a layer above a radio resource control, RRC, protocol layer of the UE;
receiving (704) a cell update message from the UE, wherein the cell update message indicates that the UE has the measurement report available to send;
transmitting (706) instructions to the UE instructing the UE to transition to a CELL_DCH RRC state; and
receiving (708) the measurement report from the UE while the UE is in the CELL_DCH RRC state.

Embodiment 30. The RAN node of Embodiment 29, wherein the cell update message comprises a cause value that indicates that the UE has the measurement report available to send.

Embodiment 31. The RAN node of any of Embodiments 29-30, wherein the instructions to transition to the CELL_DCH RRC state comprise a cell update confirm message.

Embodiment 32. The RAN node of any of Embodiments 29-31, wherein the measurement report comprises an application layer measurement report.

Embodiment 33. A user equipment, UE, node (1200), comprising:
a transceiver (1201) configured to provide wireless communication over a radio interface; and
a processor (1203) coupled with the transceiver, wherein the processor is configured to provide communication with a radio access network, RAN, node through the transceiver, and wherein the processor is configured to perform operations comprising:

receiving (502) a request from a radio access network for a measurement report for an application operating at a layer above a radio resource control, RRC, protocol layer;

generating (504) the measurement report in response to the request;

determining (506) a current RRC connected state of the UE when the measurement report is ready to be sent;

in response to determining that the current RRC connected state of the UE is not a CELL_DCH RRC state, sending (512) a cell update message to the radio access network;

receiving (514) instructions from the radio access network to transition to the CELL_DCH RRC state;

transitioning (516) to the CELL_DCH RRC state; and transmitting (518) the measurement report while the UE is in the CELL_DCH RRC state.

Embodiment 34. The UE node of Embodiment 33, wherein sending the cell update message comprises sending the cell update message if the current RRC connected state of the UE is a CELL_FACH RRC state, a URA_PCH RRC state or a CELL_PCH RRC state.

Embodiment 35. The UE node of any of Embodiments 33-34, wherein the cell update message comprises a cause value that indicates that the UE has the measurement report available to send.

Embodiment 36. The UE node of any of Embodiments 33-35, wherein the instructions from the radio access network to transition to the CELL_DCH RRC state comprise a cell update confirm message.

Embodiment 37. The UE node of any of Embodiments 33-36, wherein the measurement report comprises an application layer measurement report.

Embodiment 38. The UE node of any of Embodiments 33-37, wherein the request is received via an RRC protocol message.

Embodiment 39. The UE node of Embodiment 33, wherein the sending the cell update message comprises sending the cell update message using an RRC protocol.

Embodiment 40. A radio access network, RAN, node (1100), comprising:
  a network interface (1105) configured to provide communications over a network; and
  a processor (1103) coupled with the network interface, wherein the processor is configured to provide communication with a user equipment (UE) node through the network interface, and wherein the processor is configured to perform operations comprising:
  transmitting (702) a request for a measurement report to a user equipment, UE, node, for an application operating in the UE at a layer above a radio resource control, RRC, protocol layer of the UE;
  receiving (704) a cell update message from the UE, wherein the cell update message indicates that the UE has the measurement report available to send;
  transmitting (706) instructions to the UE instructing the UE to transition to a CELL_DCH RRC state; and
  receiving (708) the measurement report from the UE while the UE is in the CELL_DCH RRC state.

Embodiment 41. The RAN node of Embodiment 40, wherein the cell update message comprises a cause value that indicates that the UE has the measurement report available to send.

Embodiment 42. The RAN node of any of Embodiments 40-41, wherein the instructions to transition to the CELL_DCH RRC state comprise a cell update confirm message.

Embodiment 43. The RAN node of any of Embodiments 40-42, wherein the measurement report comprises an application layer measurement report.

Embodiment 44. A method in a user equipment, UE, comprising:
  receiving (502) a request from a radio access network for a measurement report for an application operating at a layer above a radio resource control, RRC, protocol layer;
  generating (506) the measurement report in response to the request;
  determining (506) a current state of the UE when the measurement report is ready to be sent;
  in response to determining that the current state of the UE is not a state in which the UE is authorized to transmit the measurement report to the radio access network, sending (512) a cell update message to the radio access network;
  receiving (514) instructions from the radio access network to transition to the state in which the UE is authorized to transmit the measurement report to the radio access network;
  transitioning (516) to the state in which the UE is authorized to transmit the measurement report to the radio access network; and
  transmitting (518) the measurement report while the UE is in the state in which the UE is authorized to transmit the measurement report to the radio access network.

Embodiment 45. A user equipment, UE, node (1200), comprising:
  a transceiver (1201) configured to provide wireless communication over a radio interface; and
  a processor (1203) coupled with the transceiver, wherein the processor is configured to provide communication with a radio access network, RAN, node through the transceiver, and wherein the processor is configured to perform operations comprising:
  receiving (502) a request from a radio access network for a measurement report for an application operating at a layer above a radio resource control, RRC, protocol layer;
  generating (504) the measurement report in response to the request;
  determining (506) a current state of the UE when the measurement report is ready to be sent;
  in response to determining that the current state of the UE is not a state in which the UE is authorized to transmit the measurement report to the radio access network, sending (512) a cell update message to the radio access network;
  receiving (514) instructions from the radio access network to transition to the state in which the UE is authorized to transmit the measurement report to the radio access network;
  transitioning (516) to the state in which the UE is authorized to transmit the measurement report to the radio access network; and
  transmitting (518) the measurement report while the UE is in the state in which the UE is authorized to transmit the measurement report to the radio access network.

Embodiment 46. A method in a radio access network, RAN, node comprising:
  transmitting (702) a request for a measurement report to a user equipment, UE, node, for an application operating in the UE at a layer above a radio resource control, RRC, protocol layer of the UE;

receiving (704) a cell update message from the UE, wherein the cell update message indicates that the UE has the measurement report available to send;

transmitting (706) instructions to the UE instructing the UE to transition to a state in which the UE is authorized to transmit the measurement report to the radio access network; and receiving (708) the measurement report from the UE while the UE is in the state in which the UE is authorized to transmit the measurement report to the radio access network.

Embodiment 47. A radio access network, RAN, node (1100), comprising:

a network interface (1105) configured to provide communications over a radio access network; and a processor (1103) coupled with the network interface, wherein the processor is configured to provide communication with a user equipment (UE) node through the network interface, and wherein the processor is configured to perform operations comprising:

transmitting (702) a request for a measurement report to a user equipment, UE, node, for an application operating in the UE at a layer above a radio resource control, RRC, protocol layer of the UE;

receiving (704) a cell update message from the UE, wherein the cell update message indicates that the UE has the measurement report available to send;

transmitting (706) instructions to the UE instructing the UE to transition to a state in which the UE is authorized to transmit the measurement report to the radio access network; and receiving (708) the measurement report from the UE while the UE is in the state in which the UE is authorized to transmit the measurement report to the radio access network.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, Embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

The following abbreviations may be used in the foregoing detailed description:
3GPP Third Generation Partnership Project
CN Core Network
eNB E-UTRAN Node B
E-UTRAN Evolved Universal Terrestrial Radio Access Network
gNB gNode B (a Node B supporting NR and connectivity to NGC)
HSPA High-Speed Packet Access
LTE Long Term Evolution
NGC Next Generation Core
NR New Radio
O&M Operation and Maintenance
PS Packet Switched
QoE Quality of Experience
RAB Radio Access Bearer
RAN Radio Access Network
RANAP Radio Access Network Application Part
RNC Radio Network Controller
RRC Radio Resource Control
UE User Equipment
UMTS Universal Mobile Telecommunications System
UTRAN Universal Terrestrial Radio Access Network Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method in a user equipment, UE, comprising:
receiving a request from a radio access network for a measurement report for an application operating at a layer above a radio resource control, RRC, protocol layer;
generating the measurement report in response to the request;
determining a current RRC connected state of the UE when the measurement report is ready to be sent;
in response to determining that the current RRC connected state of the UE is not a CELL_DCH RRC state, sending a cell update message to the radio access network, wherein sending the cell update message comprises sending the cell update message if the current RRC connected state of the UE is a CELL_FACH RRC state, a URA_PCH RRC state or a CELL_PCH RRC state;
receiving instructions from the radio access network to transition to the CELL_DCH RRC state;
transitioning to the CELL_DCH RRC state; and
transmitting the measurement report while the UE is in the CELL_DCH RRC state.

2. The method of claim 1, wherein the cell update message comprises a cause value that indicates that the UE has the measurement report available to send.

3. The method of claim 1, wherein the instructions from the radio access network to transition to the CELL_DCH RRC state comprise a cell update confirm message.

4. The method of claim 1, wherein the measurement report comprises an application layer measurement report.

5. The method of claim 1, wherein the request is received via an RRC protocol message.

6. The method of claim 1, wherein the sending the cell update message comprises sending the cell update message using an RRC protocol.

7. A method in a radio access network, RAN, node comprising:
transmitting a request for a measurement report to a user equipment, UE, node, for an application operating in the UE at a layer above a radio resource control, RRC, protocol layer of the UE;
receiving a cell update message from the UE, wherein the cell update message indicates that the UE has the measurement report available to send;
transmitting instructions to the UE instructing the UE to transition to a CELL_DCH RRC state; and
receiving the measurement report from the UE while the UE is in the CELL_DCH RRC state.

8. The method of claim 7, wherein the cell update message comprises a cause value that indicates that the UE has the measurement report available to send.

9. The method of claim 7, wherein the instructions to transition to the CELL_DCH RRC state comprise a cell update confirm message.

10. The method of claim 7, wherein the measurement report comprises an application layer measurement report.

11. A user equipment, UE, node, comprising:
a transceiver, the transceiver containing components whereby the UE is operative to provide wireless communication over a radio interface; and
a processor coupled with the transceiver, wherein the processor containing components to provide communication with a radio access network, RAN, node through the transceiver, and whereby the processor is operative to:
receive a request from a radio access network for a measurement report for an application operating at a layer above a radio resource control, RRC, protocol layer;
generate the measurement report in response to the request;
determine a current RRC connected state of the UE when the measurement report is ready to be sent;
in response to determining that the current RRC connected state of the UE is not a CELL_DCH RRC state, send a cell update message to the radio access network, wherein the send the cell update message comprises send the cell update message if the current RRC connected state of the UE is a CELL_FACH RRC state, a URA_PCH RRC state or a CELL_PCH RRC state;

receive instructions from the radio access network to transition to the CELL_DCH RRC state;
transition to the CELL_DCH RRC state; and
transmit the measurement report while the UE is in the CELL_DCH RRC state.

12. The UE node of claim 11, wherein the cell update message comprises a cause value that indicates that the UE has the measurement report available to send.

13. The UE node of claim 11, wherein the instructions from the radio access network to transition to the CELL_DCH RRC state comprise a cell update confirm message.

14. The UE node of claim 11, wherein the measurement report comprises an application layer measurement report.

15. The UE node of claim 11, wherein the request is received via an RRC protocol message.

16. The UE node of claim 11, wherein the send the cell update message comprises send the cell update message using an RRC protocol.

17. A radio access network, RAN, node, comprising:
a network interface, the network interface including components whereby the RAN node is operative to provide communications over a network; and
a processor coupled with the network interface, wherein the processor including components to provide communication with a user equipment (UE) node through the network interface, and whereby the processor is operative to:
transmit a request for a measurement report to a user equipment, UE, node, for an application operating in the UE at a layer above a radio resource control, RRC, protocol layer of the UE;
receive a cell update message from the UE, wherein the cell update message indicates that the UE has the measurement report available to send and wherein the receive a cell update message from the UE comprises the cell update message sent from the UE if the current RRC connected state of the UE is a CELL_FACH RRC state, a URA_PCH RRC state or a CELL_PCH RRC state;
transmit instructions to the UE instructing the UE to transition to a CELL_DCH RRC state; and
receive the measurement report from the UE while the UE is in the CELL_DCH RRC state.

18. The RAN node of claim 17, wherein the cell update message comprises a cause value that indicates that the UE has the measurement report available to send.

19. The RAN node of claim 17, wherein the instructions to transition to the CELL_DCH RRC state comprise a cell update confirm message.

20. The RAN node of claim 17, wherein the measurement report comprises an application layer measurement report.

* * * * *